US009545589B2

United States Patent
Morris et al.

(10) Patent No.: US 9,545,589 B2
(45) Date of Patent: Jan. 17, 2017

(54) FILTER HOUSING WITH TAPERED RIP CORD

(71) Applicant: Caterpillar Inc., Peoria, IL (US)

(72) Inventors: Bryant Morris, Peoria, IL (US); Jeffrey Ries, Metamora, IL (US); Darrell Morehouse, III, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 14/502,693

(22) Filed: Sep. 30, 2014

(65) Prior Publication Data

US 2016/0089621 A1  Mar. 31, 2016

(51) Int. Cl.

| | |
|---|---|
| *B01D 35/30* | (2006.01) |
| *B01D 46/00* | (2006.01) |
| *F16L 37/14* | (2006.01) |
| *B01D 29/21* | (2006.01) |
| *B01D 29/96* | (2006.01) |

(52) U.S. Cl.
CPC ............... *B01D 35/30* (2013.01); *B01D 29/21* (2013.01); *B01D 29/96* (2013.01); *B01D 46/0002* (2013.01); *B01D 46/0004* (2013.01); *F16L 37/148* (2013.01); *B01D 2201/291* (2013.01); *B01D 2201/302* (2013.01); *B01D 2201/4076* (2013.01); *B01D 2265/021* (2013.01); *B01D 2265/024* (2013.01)

(58) Field of Classification Search
CPC . B01D 35/30; B01D 46/0002; B01D 46/0004; B01D 2201/40; B01D 2265/02; B01D 2265/021; B01D 2265/024; B01D 2265/027; F16L 21/08; F16L 37/148
See application file for complete search history.

(56) References Cited

U.S. PATENT DOCUMENTS

| 6,343,813 B1 * | 2/2002 | Olson ................... F16L 37/148 285/305 |
| 6,726,738 B1 | 4/2004 | Walker, Jr. |
| 2011/0132828 A1 * | 6/2011 | Ries ....................... B01D 29/15 210/232 |

FOREIGN PATENT DOCUMENTS

WO  2014/008930 A1  1/2014

* cited by examiner

*Primary Examiner* — Robert Clemente

(57) ABSTRACT

A connection includes a first component, second component and a cord member. The first component has an opening with an inner surface and a first annular groove disposed about the inner surface. The second component has a top end configured to fit in the opening. The top end has an outer surface with a second annular groove disposed about the outer surface. The first annular groove and the second annular groove are configured to form a channel in response to being disposed in cooperative alignment. The cord member is configured to be removably inserted into the channel to secure the first component to the second component. The cord member includes a tapered portion disposed at a distal end of the cord member and is configured to provide a mechanical advantage to urge the first annular groove and the second annular groove into cooperative alignment in response to being inserted therein.

17 Claims, 5 Drawing Sheets

FILTER HOUSING WITH TAPERED RIP CORD

TECHNICAL FIELD

This patent disclosure relates generally to a filter assembly and, more particularly, to a connection between a base and housing of the filter assembly.

BACKGROUND

Filter assemblies are known in the art for use in various applications, for example, internal combustion engines, hydraulic or pneumatic systems, and the like. These filter assemblies may be used to filter fluids in fuel systems, lubrication oil systems, hydraulic oil systems, air or exhaust filtration systems etc. There are different types of filters, such as canister type of filters, spin-on type of filters, etc. Servicing of such filter assemblies at regular intervals is important, as filter elements in these filter assemblies may tend to get clogged by impurities of the fluid being filtered, and may require replacement.

U.S. Pat. No. 6,726,738 (hereinafter "the '738 patent"), entitled "Air Filter Assembly," describes a filter assembly with a clasp assembly to connect a filter element to a filter housing. This clasp includes a "V" shaped band that acts to compress flanges on the filter element and filter housing together. However, the band is conventional in the sense that it is similar to conventional compression bands used to secure lids to barrels. Such bands are subject accidental opening unless secured. The bands are also susceptible to the elements and may rust or otherwise degrade over time. The '738 patent does not provide any remedies for these failings of conventional compression bands.

Accordingly, there is a need for an improved connection to address the problems described above and/or problems posed by other conventional approaches.

SUMMARY

The foregoing needs are met, to a great extent, by the present disclosure, wherein aspects of an improved connection are provided.

In one aspect, the disclosure describes a connection. The connection includes a first component, second component and a cord member. The first component has an opening with an inner surface and a first annular groove disposed about the inner surface. The second component has a top end configured to fit in the opening. The top end has an outer surface with a second annular groove disposed about the outer surface. The first annular groove and the second annular groove are configured to form a channel in response to being disposed in cooperative alignment. The cord member is configured to be removably inserted into the channel to secure the first component to the second component. The cord member includes a tapered portion disposed at a distal end of the cord member and is configured to provide a mechanical advantage to urge the first annular groove and the second annular groove into cooperative alignment in response to being inserted therein.

In another aspect, the disclosure describes a filter assembly. The filter assembly includes a base, filter housing, and cord member. The base has an opening with an inner surface and a first annular groove disposed about the inner surface. The filter housing has a top end configured to fit in the opening. The top end has an outer surface with a second annular groove disposed about the outer surface. The first annular groove and the second annular groove are configured to form a channel in response to being disposed in cooperative alignment. The cord member is configured to be removably inserted into the channel to generate a connection between the base and filter housing. The connection is defined by the cord member disposed within the channel to maintain alignment of the first annular groove with the second annular groove. The cord member includes a tapered portion disposed at a distal end of the cord member and configured to provide a mechanical advantage to urge the first annular groove and the second annular groove into cooperative alignment in response to being inserted therein.

In yet another aspect, the disclosure describes a cord member. The cord member includes a first end, second end, and body. The body is disposed between the first end and the second end. The body has a length, height, and width. The body includes a tapered portion and a tapered cutout portion. The tapered portion is disposed along a portion of the length of the body and ending at the first end. The tapered portion is configured to taper down from the height of the body to a lesser height at the first end. The tapered cutout portion is disposed near the second end and is configured to receive the tapered portion. A combined height of the tapered portion and the tapered cutout portion is equal to the height of the body.

There has thus been outlined, rather broadly, certain aspects of the disclosure in order that the detailed description thereof herein may be better understood, and in order that the present contribution to the art may be better appreciated. There are, of course, additional aspects that will be described below and which will form the subject matter of the claims appended hereto.

In this respect, before explaining at least one example in detail, it is to be understood that the disclosure is not limited in its application to the details of construction and to the arrangements of the components set forth in the following description or illustrated in the drawings. The disclosed device and method is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. It is important, therefore, that the claims be regarded as including such equivalent constructions insofar as they do not depart from the spirit and scope of the various aspects.

DETAILED DESCRIPTION

Figure 1:
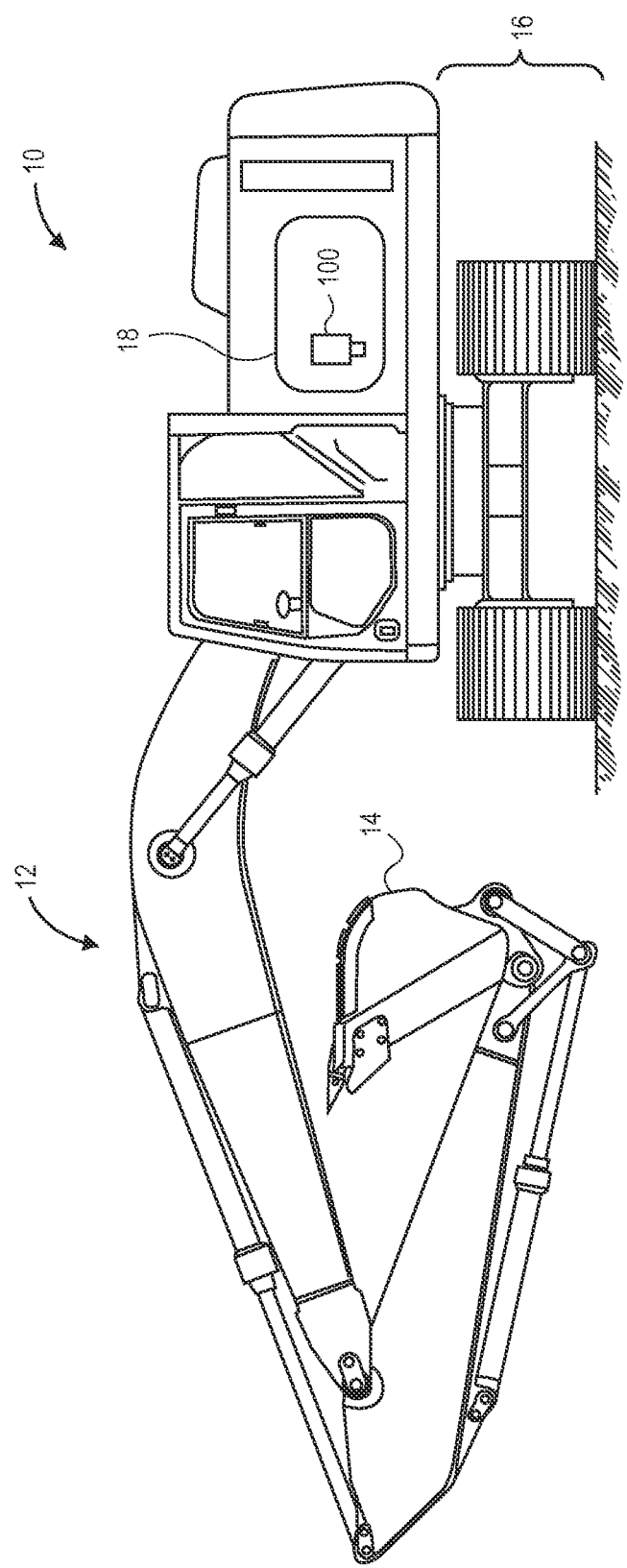
FIG. 1 is a view of an exemplary machine, according to an aspect of the disclosure.

The present disclosure relates to a filter assembly. FIG. 1 illustrates an exemplary machine 10 having various systems and components that cooperate to accomplish a task. The machine 10 may embody a fixed or mobile machine that performs some type of operation associated with an industry such as mining, construction, farming, transportation, power generation, or another industry known in the art. For example, the machine 10 may be an earth moving machine such as an excavator (shown in FIG. 1), a dozer, a loader, a backhoe, a motor grader, a dump truck, or another earth moving machine. The machine 10 may include an implement system 12 configured to move a work tool 14, a drive system 16 for propelling the machine 10, a power source 18.

In a particular example, the power source 18 includes an engine configured to combust a fuel such as diesel and this fuel is filtered at a filter assembly 100. As fuel passes through the filter assembly 100, contaminants such as water, debris, and the like are filtered out and collect in the filter assembly 100. Periodically, the filter assembly 100 is inspected to determine if a filter medium (described further herein) disposed within the filter assembly 100 should be replaced. For example, if sufficient debris has collected on the filter medium, the filter medium may be replaced. As described herein, it is an advantage of embodiments of the filter assembly 100 that the filter assembly 100 is easier and less time consuming to inspect and replace the filter medium than conventional filter cartridges. These and other advantages are described herein. Of note, while particular example is made throughout of filtering fuel, the various embodiments are not limited to filtering fuel, but rather, include any suitable filtering application. Examples of suitable filtering applications include hydraulic, lubricant, air, or other such filtration systems.

Figure 2:
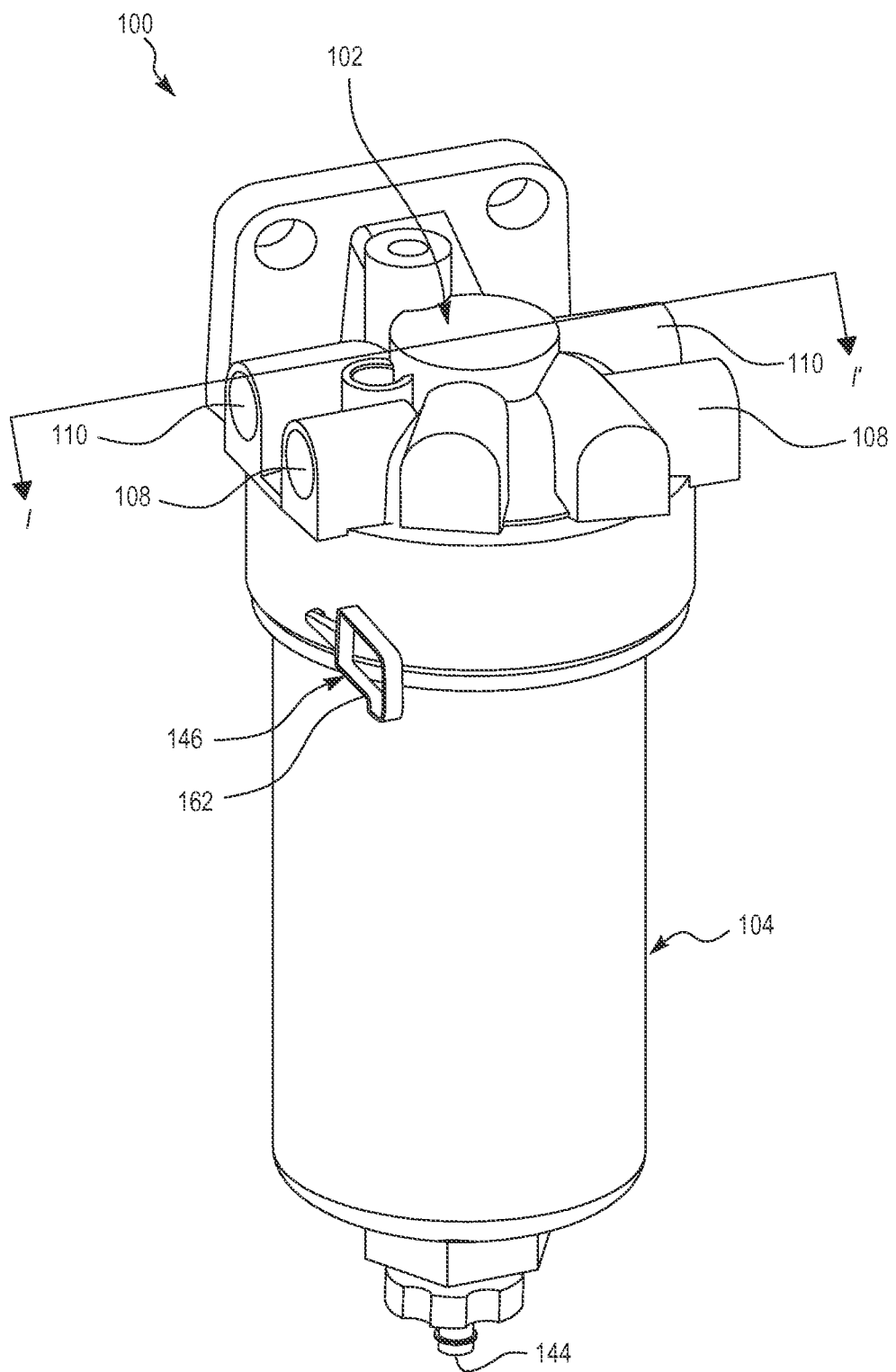
FIG. 2 is a perspective view of an exemplary filter assembly, according to an embodiment of the present disclosure.

FIG. 2 illustrates a perspective view of an exemplary filter assembly 100 according to an embodiment of the present disclosure. The filter assembly 100 is embodied as a canister type filter assembly. However, in another embodiment, the filter assembly 100 includes any suitable type of filter assembly known in the art. The filter assembly 100 may be used in equipment such as internal combustion engines, pneumatic systems, hydraulic systems, and the like. The filter assembly 100 may be used in various industrial applications, for example, construction, mining, transport, power generation, etc. The filter assembly 100 may be used to filter contaminants from fluids in fuel systems, lubrication oil systems, hydraulic fluid power systems, hydraulic fluid control systems, transmission systems, engine air intake systems, engine exhaust systems, etc. Further, the filter assembly 100 may be used to filter diesel, gasoline, hydraulic or lubrication oil or any other liquids. In other embodiments, the filter assembly 100 may be used as a water/fuel separator. Moreover, the filter assembly 100 may also be used to filter air, exhaust gases, or any other gaseous fluids.

The filter assembly 100 includes a first component 102, and a second component 104 detachably coupled to the first component 102. In an embodiment, the first component 102 is a base, hereinafter referred to as the base 102, of the filter assembly 100. The second component 104 is a housing, hereinafter referred to as the housing 104. As shown in FIGS. 1 and 2, the base 102 and the housing 104 are substantially cylindrical in shape, however, it may be contemplated that the shapes of the base 102 and the housing 104 are merely exemplary and may be varied without deviating from the scope of the claimed subject matter. For example, the base 102 and the housing 104 may have non-circular shapes, such as polygonal, elliptical, and the like. In various examples, the base 102 and/or housing 104 may include any suitable material. Examples of suitable materials include metals, polymers, resins, and the like. These and other materials may be cast, punched, pressed, machined or otherwise formed in any suitable manner.

Figure 3:
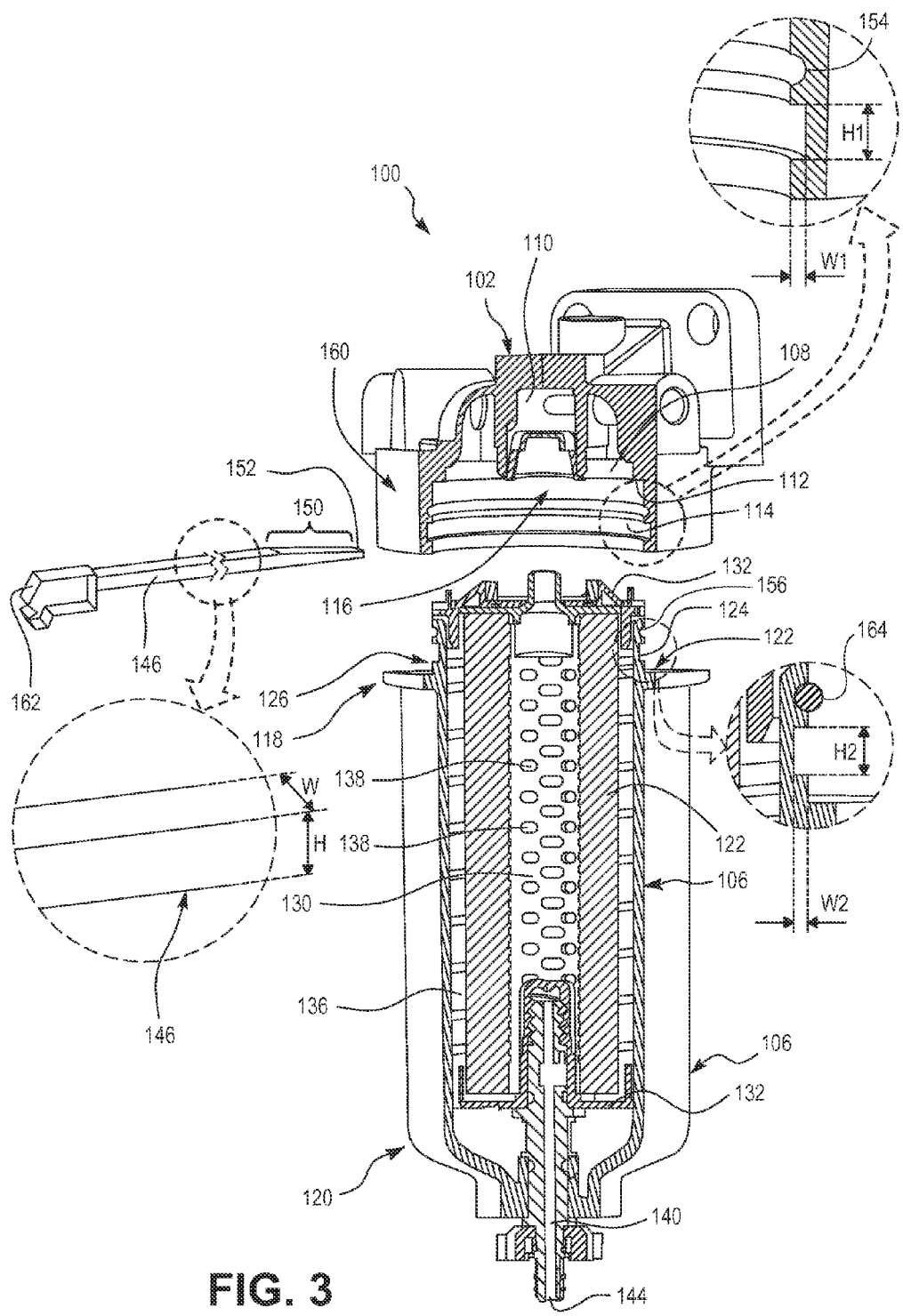
FIG. 3 is a front sectional view of a disassembled filter assembly of FIG. 2.
Figure 4:
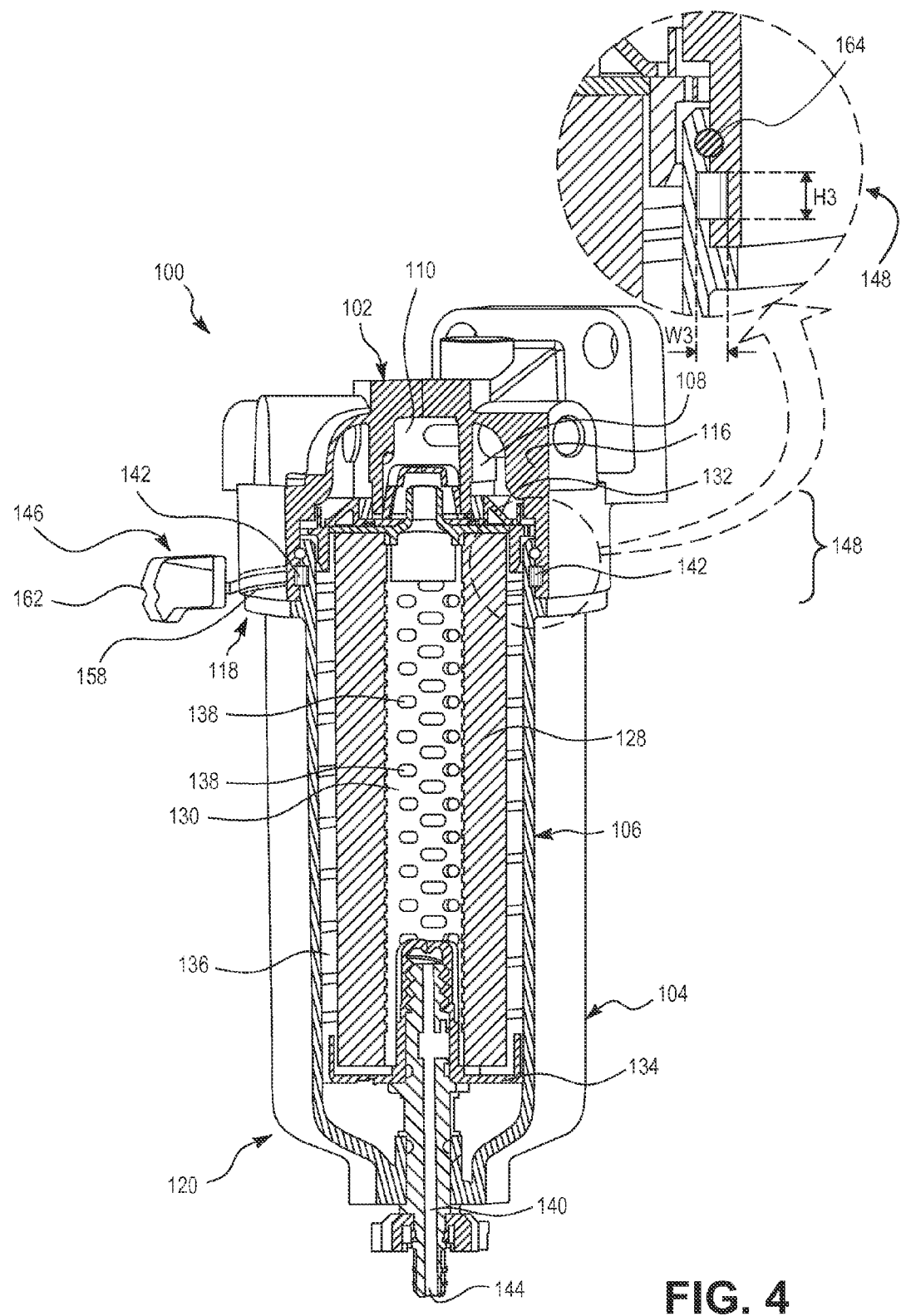
FIG. 4 is a front sectional view of an assembled filter assembly of FIG. 2.

FIG. 3 illustrates a front sectional view of a disassembled filter assembly 100 along an axis I-I'. FIG. 4 illustrates a front sectional view of an assembled filter assembly 100 taken along the axis I-I', according to the embodiments of the present disclosure. As shown in FIGS. 2 and 3, the filter assembly 100 further includes a filter element 106 housed at least partially within the housing 104. In an exemplary embodiment, the filter element 106 is removably received within the housing 104, such as in a canister type filter assembly. Alternatively, the filter element 106 is fixedly received within the housing 104.

As shown in FIGS. 2 to 4, the base 102 includes an inlet port 108 and an outlet port 110. The filter element 106 is configured to be in fluid communication with the inlet port 108 and the outlet port 110. The inlet port 108 is configured to facilitate fluid intake into the filter assembly 100. The outlet port 110 is configured to facilitate fluid discharge from the filter assembly 100. The base 102 further includes a stepped portion 112 having a first groove 114 disposed therein. In an exemplary embodiment, the first groove 114 may be a continuous annular groove disposed on an inner surface 116 of the stepped portion 112 of the base 102. Alternatively, the first groove 114 may be a discontinuous groove forming a cavity located on the inner surface 116 of the stepped portion 112. Further, the first groove 114 may have a substantially rectangular cross-section. Alternatively, the first groove 114 may have any other cross-sectional shape, such as circular, triangular, and the like. In an exemplary embodiment, the first groove 114 may have a height H1 and a width W1.

Further, the housing 104 includes a top end 118 and a bottom end 120. The top end 118 includes a stepped portion 122 configured to be attached to the base 102. The stepped portion 122 of the housing 104 includes a second groove 124 disposed therein. The second groove 124 is located on an outer surface 126 of the housing 104. In an exemplary embodiment, the second groove 124 may be a continuous annular groove located on the outer surface 126 of the housing 104. Alternatively, the second groove 124 may also be a discontinuous groove forming a cavity similar to the one formed by the first groove 114 as explained above. In an exemplary embodiment, the second groove 124 may have a height H2 and a width W2.

In an embodiment, the first and the second grooves 114, 124 have substantially similar cross-sections. For example, similar to the first groove 114, the second groove 124 may also have a substantially rectangular cross-section. Alternatively, the second groove 124 may have any other cross-sectional shape, such as circular, triangular, and the like. In an exemplary embodiment, the height H2 of the second groove 124 may also be equal to the height H1 of the first groove 114.

The filter element 106 includes an annularly arranged filter media 128 circumferentially surrounding a central reservoir defined by a central tube 130. Axial ends of the filter media 128 are sealed by a top end cap 132 and a bottom end cap 134. The top end cap 132 defines an axial open end of the filter element 106. The bottom end cap 134 defines an axial closed end of the filter element 106. The top end cap 132 includes an opening (not shown) configured to facilitate passage of fluid to the outlet port 110 from the central tube 130. The bottom end cap 134 is configured to prevent any fluid outside the filter element 106, adjacent to the axial end of the filter media 128, from flowing unfiltered into the central tube 130. The top and the bottom end caps 132, 134 may be joined to the central tube 130 by welding, adhesives, mechanical coupling, etc. Alternatively, some or all of the central tube 130, the top end cap 132, and the bottom end cap 134 may be constructed as unitary components.

Fluid to be filtered enters from the inlet port 108 and flows into an annular cavity 136 between the housing 104 and the filter media 128. The fluid passes into and through the filter media 128 and then into the central tube 130 via perforations 138 provided in the central tube 130. The fluid exits the central tube 130 through the top end cap 132 and the opening into the outlet port 110. As shown in FIG. 4, the top end cap 132 and the bottom end cap 134 are configured to define a fluid path for flow of the fluid into and out of the filter media 128, thereby preventing any fluid from flowing directly to the outlet port 110 and bypassing the filter media 128.

Furthermore, the filter assembly 100 includes a drain 140 releaseably coupled to the bottom end 120 of the housing 104. The drain 140 provides a channel for removing the fluid inside the housing 104. An inlet end (not shown) of the drain 140 is positioned within the housing 104 and an outlet end 144 of the drain 140 is positioned outside the housing 104. The drain 140 may be moved between an open and a closed position. It may be contemplated that in the open position, the fluid within the housing 104 may be drained out via the outlet end 144 of the drain 140.

As illustrated in FIGS. 3 and 4, the base 102 and the housing 104 are detachably coupled to each other at the respective stepped portions 112 and 122. The base 102 at least partially receives the housing 104. In an exemplary embodiment, the stepped portion 112 of the base 102 abuts the stepped portion 122 of the housing 104, such that in response to the first groove 114 and the second groove 124 are disposed in cooperative alignment and a channel 142 is formed therebetween. In an embodiment, the channel 142 may be a continuous channel formed by the grooves 114, 124 between the base 102 and the housing 104. Alternatively, the channel 142 may be a discontinuous channel formed by the grooves 114, 124 when the base 102 and the housing 104 are coupled. It may be contemplated, that the cross-section of the channel 142 depends on the cross-section of the first and the second grooves 114, 124. For example, the cross-section of the channel 142 may be substantially rectangular, square, circular or triangular, and the like. The height H3 of the channel 142 may be equal to the height H1 and H2 of the first and the second grooves 114, 124 respectively.

In an embodiment, the filter assembly 100 includes a cord member 146 configured to form a connection 148 between the base 102 and the housing 104. The connection is formed by removably inserting the cord member 146 in the channel 142 between the first and the second groove 114, 124. The cord member 146 is inserted and/or removed to lock and/or unlock, respectively, the housing 104 with the base 102. At a distal end of the cord member 146, the cord member includes a tapered portion 150 and a leading edge 152. The leading edge 152 may be inserted via an access passage 158 extending from the channel 142 to an outer surface 160 of the base 102. As the tapered portion 150 is inserted, the first groove 114 and the second groove 124 are urged into alignment. In this regard, the tapered portion 150 is configured to provide a mechanical advantage to the user. In this regard, the base 102 may include a gasket seat 154 and the housing 104 may include a gasket seat 156. A gasket 164 may be disposed between the gasket seat 154 and the gasket seat 156 to form a seal. In order to seat the gasket 164 between the gasket seat 154 and the gasket seat 156, a predetermined amount of compressive force may be applied to base 102 and the housing 104. This predetermined amount of compressive force may depend upon a variety of factors such as, for example, fluid viscosity, fluid pressure, size of the gasket 164, material properties of the gasket 164, and the like. The mechanical advantage provided by the insertion of the tapered portion 150 may be configured to generally correspond to the amount of compressive force to seat the gasket 164. For example, the slope of the tapered portion 150 may be relatively steep in response to the compressive force being relatively low. In another example, the slope of the tapered portion 150 may be relatively shallow in response to the compressive force being relatively high. Accordingly, the tapered portion 150 may occupy from about $1/10^{th}$ the total length of the cord member 146 to about the total length of the cord member 146.

Figure 5:
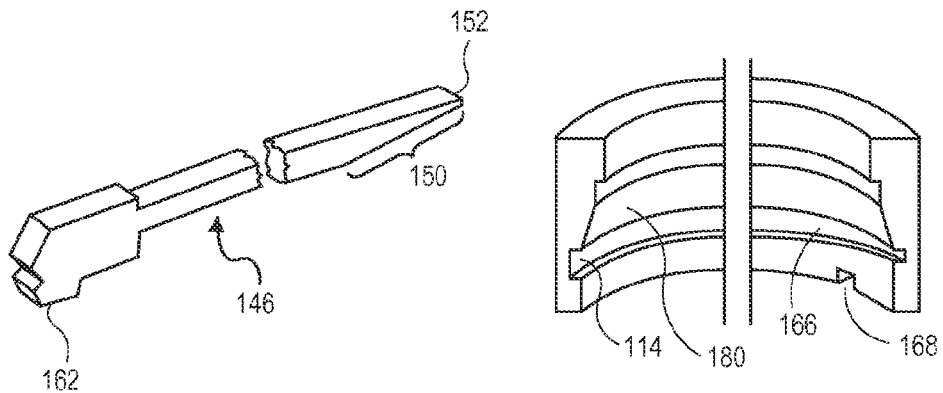
FIG. 5 is a perspective view of a cord member and a perspective sectional view of a portion of a filter base of FIG. 2.
Figure 6:
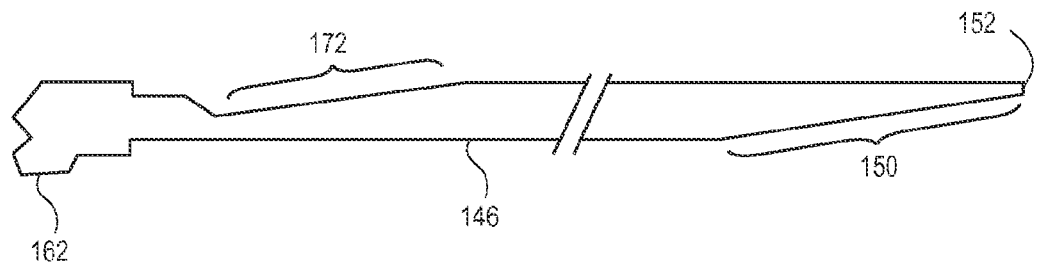
FIG. 6 is a perspective view of a cord member according to another aspect.
Figure 7:
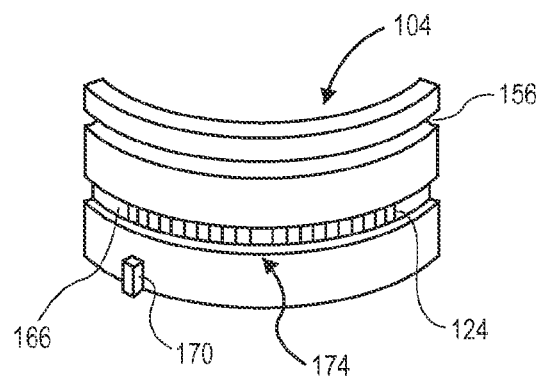
FIG. 7 is a perspective view of a portion of a filter housing of FIG. 2.

As shown in FIG. 5 to FIG. 7, the tapered portion 150 may be configured to mate with the first groove 114 and the second groove 124 in a variety of ways. For example, the first groove 114 and/or the second groove 124 may include a corresponding tapered portion 166. In this manner, the annular connection between the base 102 and the housing 104 may be fully supported about the channel 142 (shown in FIG. 4). To align the respective tapered portions 166, an indicator or indexing device may be included. For example, the base 102 may include a slot 168 and the housing 104 may include a tab 170. In a typical manner, the tab 170 may be configured to mate with the slot 168 to index or align the respective tapered portions 166.

As shown in FIG. 5, a forcing cone 180 may be disposed over the first groove 114 to engage and compress the gasket 164 (shown in FIG. 3). In this example, as the tapered portion 150 is introduced into the channel 142 (shown in FIG. 4), the forcing cone 180 is urged to slide downward over the gasket 164. In response to the forcing cone 180 sliding downward over the gasket 164, the relative diameter of the forcing cone is reduced to compress the gasket 164 and form a seal.

In another example shown in FIG. 6, the cord member 146 may include a tapered cutout portion 172 disposed near a proximal end of the cord member 146 to receive the tapered portion 150. In this example, the cord member 146 is longer than the length of the channel 142 such that the tapered portion 150 wraps around the channel 142 and slides under the tapered cutout portion 172. When mated, the tapered portion 150 and the tapered cutout portion 172 have a height equal to height H shown in FIG. 3. In this manner, the first groove 114 and the second groove 124 may be configured as regular, un-tapered, grooves while being fully supported about the perimeter of the connection.

Also shown in FIG. 7, the second groove 124 may, optionally, include a gripping surface 174. If included, the gripping surface 174 may be configured to grip the cord member 146 as the cord member 146 is being inserted into the channel 142 (shown in FIG. 4). The housing 104 may then be rotated relative to the base 102 to draw the cord member 146 into the channel 142. Similarly, the housing 104 may be rotated in a reverse direction relative to the base 102 to urge the cord member 146 out of the channel 142.

However, in other examples, friction of the gasket 164 may substantially prevent rotation of the housing 104 relative to the base 102 and thus, the gripping surface 174 may be omitted.

In an exemplary embodiment, the cord member 146 may be a spline made up of a deformable material, such as rubber, so that when inserted in the channel 142, the cord member 146 may be deformed to fit into the channel 142. Therefore, in this embodiment, a width W and/or a height H of the cord member 146 may be substantially equal to a width W3 and/or the height H3 of the channel 142 (shown in FIG. 4). It may be contemplated that the width W1 and W2 of the grooves 114, 124 may be same or different so as to be summed up to form the channel 142 of the width W3 (W1+W2=W3). In various other embodiments, the cord member 146 may be made of a polymer, plastic, resin, metal, braided wire, and/or the like. Specific examples of materials suitable for use in the cord member 146 include nylon, nylon-6,6, high density polyethylene, ultra-high molecular weight polyethylene, and the like. Therefore, in the alternative embodiments, the width W and the height H of the cord member 146 may be less than or equal to the width W3 and the height H3 of the channel 142.

The cross-section of the cord member 146 is substantially similar to the cross-section of the channel 142, the first groove 114 and the second groove 124. For example, the cross-section of the cord member 146 may be substantially rectangular, circular, etc. In addition, the cord member 146 may be textured or beaded with the beads running along the axis of the cord member 146 or perpendicularly across the cord member 146. Further, the cord member 146 includes a grasping portion 162. As shown in FIG. 2, the grasping portion 162 projects from the access passage 158 and is configured to facilitate a user to hold the cord member 146 while inserting and removing it from the channel 142. The base 102 and the housing 104 may be further coupled by using releasable locking mechanism for the stepped portions 112, 122 of the base 102 and the housing 104 respectively, such as snap fit mechanism, threaded mechanism and/or any other mechanism known in the art.

INDUSTRIAL APPLICABILITY

The present disclosure may be applicable to any machine including a fluid filter housing assembly having a drain. Aspects of the disclosed filter housing assembly may promote ease of use, greater ability to collect fluid, operational flexibility, and performance of fluid filter housing assemblies in general and fuel systems in particular.

The industrial applicability of the filter assembly 100 for filtering fluids and the cord member 146 will be readily understood from the foregoing discussion. The tapered portion 150 of cord member 146 provides the user with a mechanical advantage to assist in overcoming the compressive force that generates the seal with the gasket 164 in the gasket seats 154 and 156. This mechanical advantage facilitates assembly and service of the filter assembly 100. The base 102, the housing 104 and the filter element 106 may be easily disassembled by removing the cord member 146, for example to clean or change the filter element 106. The configuration and the components of the filter assembly 100 as disclosed herein may be used in any type of filters, such as canister type or spin-on type of filters. The housing 104 and the filter element 106 may collectively be called as a replacement component of the filter assembly 100, where the replacement component may be replaced or at least detached from the base 102 for replacing the one or more components of the same.

Additionally, the stepped portion 112 of the base 102 and the stepped portion 122 of the housing 104 may be locked by using any known releasable locking mechanism and the cord member 146 strengthens the locking of the two components, thereby preventing unnecessary spinning of the filter assembly 100 during operation. Furthermore, the filter assembly 100 is easy to manufacture, and is also cost efficient. Moreover, the filter assembly 100 as disclosed herein may be utilized in any shape and size of the filter assembly 100, such as for circular or non-circular filter assemblies 100.

Accordingly, aspects of the disclosure enable ease of using a drain in a filter housing assembly, greater ability to collect fluids, operational flexibility, and performance of fluid filter housing assemblies in general and fuel systems in particular.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified.

We claim:

1. A connection comprising:
   a first component having an opening with an inner surface and a first annular groove disposed about the inner surface;
   a second component having a top end configured to fit in the opening, the top end having an outer surface with a second annular groove disposed about the outer surface, wherein the first annular groove and the second annular groove are configured to form a channel in response to being disposed in cooperative alignment; and
   a cord member configured to be removably inserted into the channel to secure the first component to the second component, the cord member including a tapered portion disposed at a distal end of the cord member and configured to provide a mechanical advantage to urge the first annular groove and the second annular groove into cooperative alignment in response to being inserted therein, the cord member further including a tapered cutout portion disposed near a proximal end, the tapered cutout portion corresponding to the tapered portion and configured to receive the tapered portion.

2. The connection according to claim 1, further comprising:

an access passage disposed through a side wall of the first component and in alignment with the first annular groove.

3. The connection according to claim 1, further comprising:
a groove tapered portion corresponding to the tapered portion to receive the tapered portion.

4. The connection according to claim 3, further comprising:
an indexing device to orient the first component and the second component.

5. The connection according to claim 1, further comprising:
a grasping portion disposed at a proximal end of the cord member.

6. The connection according to claim 1, further comprising:
a gripping surface disposed in the second annular groove and configured to grip the cord member, wherein rotation of the second component in a first direction relative to the first component is configured to urge the cord member into the channel.

7. A filter assembly comprising:
a base having an opening with an inner surface and a first annular groove disposed about the inner surface;
a filter housing having a top end configured to fit in the opening, the top end having an outer surface with a second annular groove disposed about the outer surface, wherein the first annular groove and the second annular groove are configured to form a channel in response to being disposed in cooperative alignment, wherein the channel includes a groove tapered portion;
an access passage extending from the channel to an outer surface of the base, the access passage being circumferentially spaced from the groove tapered portion; and
a cord member configured to be removably inserted into the channel to generate a connection between the base and filter housing, the connection being defined by the cord member disposed within the channel to maintain alignment of the first annular groove with the second annular groove, the cord member including a tapered portion disposed at a distal end of the cord member and configured to provide a mechanical advantage to urge the first annular groove and the second annular groove into cooperative alignment in response to being inserted therein, wherein the groove tapered portion is configured to receive the tapered portion of the cord member when the cord member is fully inserted into the channel.

8. The filter assembly according to claim 7, wherein the the access passage is disposed through a side wall of the base and in alignment with the first annular groove.

9. The filter assembly according to claim 7, further comprising:
An indexing device to orient the base and the filter housing.

10. The filter assembly according to claim 7, further comprising:
a grasping portion disposed at a proximal end of the cord member.

11. The filter assembly according to claim 7, further comprising:
a gripping surface disposed in the second annular groove and configured to grip the cord member, wherein rotation of the filter housing in a first direction relative to the base is configured to urge the cord member into the channel.

12. The filter assembly according to claim 7, further comprising:
a filter element disposed within the filter housing.

13. The filter assembly according to claim 7, further comprising:
a first gasket seat disposed about the inner surface of the base;
a second gasket seat disposed about the outer surface of the filter housing; and
a gasket configured to form a seal in response to the gasket being disposed between the first gasket seat and the second gasket seat, wherein the seal is formed in response to a predetermined amount of compressive force being applied to urge the base and the filter housing together.

14. The filter assembly according to claim 13, wherein a slope of the tapered portion is configured to provide a predetermined amount mechanical advantage corresponding to the predetermined amount of compressive force to urge the base and the filter housing together.

15. The filter assembly according to claim 7, wherein the cord member is beaded.

16. A cord member comprising:
a first end;
a second end; and
a body disposed between the first end and the second end, the body having a length, height, and width, the body including:
a tapered portion disposed along a portion of the length of the body and ending at the first end, the tapered portion being configured to taper down from the height of the body to a lesser height at the first end; and
a tapered cutout portion disposed near the second end, the tapered portion being configured to receive the tapered portion, wherein a combined height of the tapered portion and the tapered cutout portion is equal to the height of the body.

17. The connection according to claim 16, further comprising:
a grasping portion disposed at a proximal end of the cord member.

* * * * *

UNITED STATES PATENT AND TRADEMARK OFFICE
CERTIFICATE OF CORRECTION

PATENT NO.         : 9,545,589 B2
APPLICATION NO.    : 14/502693
DATED              : January 17, 2017
INVENTOR(S)        : Morris et al.

Page 1 of 1

It is certified that error appears in the above-identified patent and that said Letters Patent is hereby corrected as shown below:

Column 9, Lines 51-52, In Claim 8, delete "wherein the the access" and insert -- wherein the access --.

Column 10, Line 1, In Claim 9, delete "An indexing" and insert -- an indexing --.

Signed and Sealed this
Second Day of May, 2017

Michelle K. Lee
*Director of the United States Patent and Trademark Office*